Figure 1:
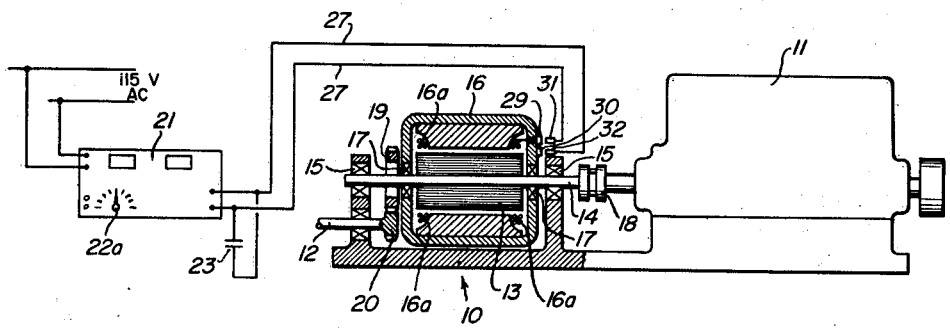

June 29, 1965 W. H. SAYLER 3,192,421
MAGNETOELECTRIC TORQUE CONVERTER WITH VARIABLE SPEED CONTROL
Filed March 2, 1961 2 Sheets-Sheet 1

INVENTOR.
WILLIAM H. SAYLER

ATTORNEYS

June 29, 1965 W. H. SAYLER 3,192,421
MAGNETOELECTRIC TORQUE CONVERTER WITH VARIABLE SPEED CONTROL
Filed March 2, 1961 2 Sheets-Sheet 2

*INVENTOR.*
WILLIAM H. SAYLER

BY Mallinckrodt
Mallinckrodt

ATTORNEYS

United States Patent Office 3,192,421
Patented June 29, 1965

3,192,421
MAGNETOELECTRIC TORQUE CONVERTER WITH VARIABLE SPEED CONTROL
William H. Sayler, 117 West 2nd South, Salt Lake City, Utah
Filed Mar. 2, 1961, Ser. No. 92,914
12 Claims. (Cl. 310—95)

This invention relates to torque converters of variable speed type and is particularly concerned with providing a magnetoelectric machine which will convert a unidirectional input torque of given speed to a reversible output torque of variable speed but of constant torque value.

There are many industrial applications for magnetoelectric torque converters, these ranging from small fractional horsepower requirements in process control and servo motor applications to large multi-horsepower requirements in connection with industrial and transport prime movers. Heretofore, however, variable output speeds attained by magnetoelectric machinery have not maintained a constant torque throughout their entire speed range.

Advantages to be derived from the maintaining by, a magnetoelectric machine, of a constant output torque value which always—even at zero speed—is a function of the input torque value, are highly significant. Thus, it is possible to exert a positive braking effect in such instances as the application of power to lifting machinery, e.g. power cranes, and to exert a positive holding action, dynamically sustained at zero speed, in these and other instances.

Variable output speeds have been achieved heretofore in a type of magnetoelectric machine having torque converter characteristics and utilizing polyphase induction motor structure as a magnetic clutch. This has been accomplished by varying the field strength of the stator component of such structure and permitting it to rotate as the power output of the machine while positively driving the rotor component as the power input. Although varying the field strength of the stator component has been effective in varying the output speed while the input speed remains constant, the output torque does vary considerably when the speed drops below a critical value significantly above zero. Moreover, speed reversal can be accomplished only by external switching. These factors having seriously limited the practical application of the machine.

The principal objective of this invention, namely, the achievement of a constant and reversible output torque from maximum output speed in one direction through zero speed to maximum output speed in the reverse direction, is accomplished by applying a current of variable frequency to the rotatable field structure of a single phase induction motor structure having a non-excited rotor arranged for mechanical connection with a rotary power source and a field structure arranged for mechanical connection with a rotary work load.

It is realized that it is common practice to vary the output speed of a single phase induction motor by applying a current of variable frequency to the field coils of the stator of such motor. However, no instance is known where the combination of components and control circuitry of this present invention has been applied or suggested or similar results achieved magnotoelectrically.

Other important objects of the invention are the achievement of precise speed control of the power-output shaft over its entire speed range, and exact positioning of the driven load independently of the degree of loading.

A specific embodiment representing what is presently regarded as the best mode of carrying out the invention is illustrated in the accompanying drawings along with certain alternative arrangements.

Figure 2:
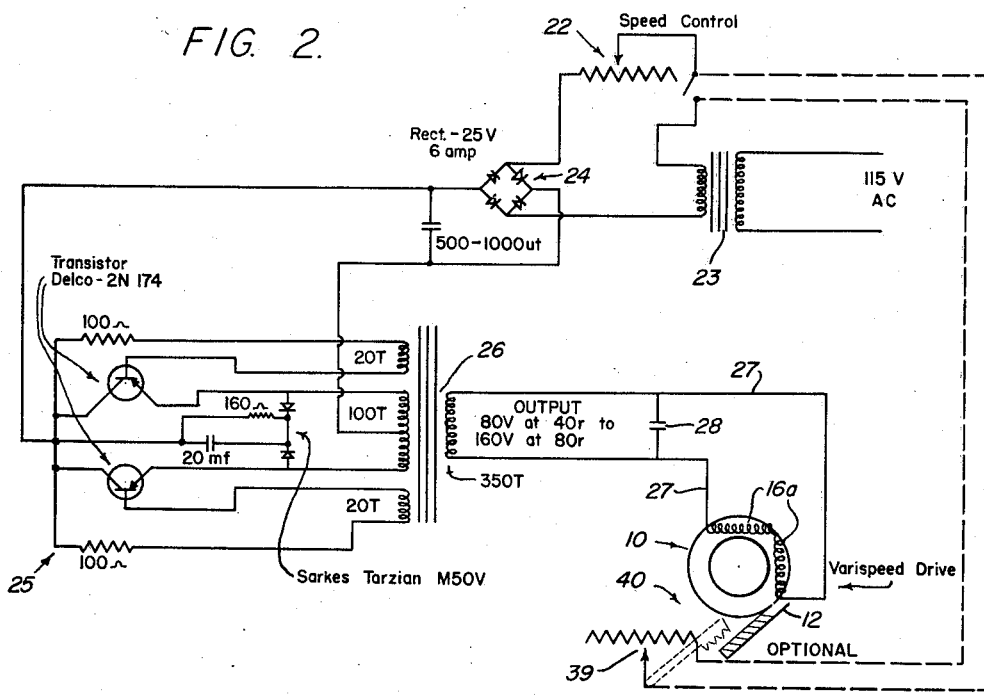
Figure 3:
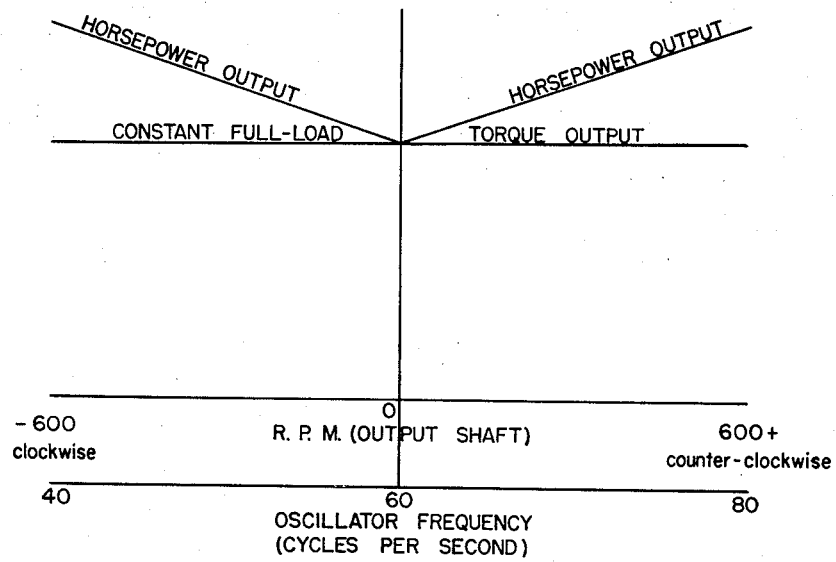

In the drawings:

FIG. 1 is a schematic showing of a magnetoelectric torque converter conforming to the invention and utilizing single phase induction motor structure;

FIG. 2, a schematic diagram of an oscillator circuit for excitation of the rotatable field structure or stator of the magnetoelectric torque converter of FIG. 1;

FIG. 3, a performance curve; and

Figure 4:
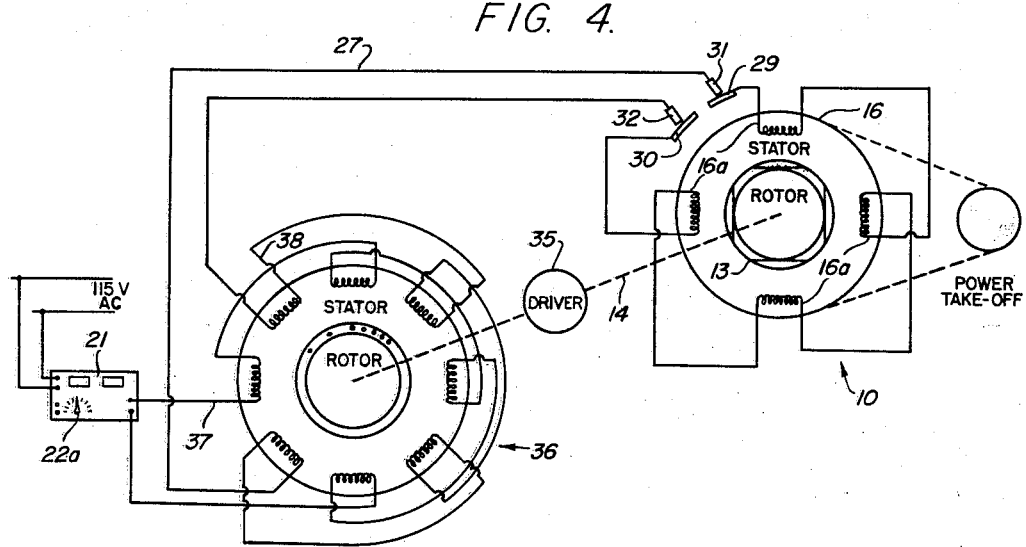

FIG. 4, a showing similar to that of FIG. 1, with the addition of a rotating amplifier for providing the rotatable field structure with higher currents than can be handled by a small standardized oscillator.

Referring to the drawings:

In the construction illustrated in FIG. 1, the torque converter 10 is interposed between a prime mover 11 and the power input shaft 12 of a driven device (not shown). In this instance, the prime mover is an internal combustion engine, but it may be an electric motor or some other device for mechanically imparting a driving torque to the torque converter.

Torque converter 10 comprises a driven element in the form of a non-excited squirrel cage rotor 13 mounted on a shaft 14 supported by bearings 15, and a variable speed element in the form of electromagnetic field structure 16 corresponding to the stator of a single phase induction motor and supported by bearings 17. Rotor shaft 14 is coupled to the driven shaft of engine 11 by a shaft coupling 18 while field structure 16 is coupled to power input shaft 12 of the driven device by means of gears 19 and 20.

Although stators of induction motors usually are excited with alternating current of constant frequency, this invention provides for exciting the electromagnetic field structure 16 of torque converter 10 with an alternating current of variable frequency in order to vary its speed and direction of rotation.

Inasmuch as the torque output of field structure 16 is a function of the voltage of its variable frequency exciting current, such output may be maintained at a constant value—while the speed of rotation of field structure 16 is varied or its direction of rotation is reversed—by varying the voltage of the exciting current as the frequency thereof is varied.

In order to prevent feed-back o f power from the torque converter to the source of the variable frequency, exciting current, such source must be non-reversible as to power flow. In the particular instance illustrated, the source is an electronic oscillator 21 of a type wherein the output voltage varies linearly with the output frequency, and wherein there is provided a variable impedance, such as the rheostat 22, FIG. 2, for varying the output frequency and voltage.

Oscillator 21 is not new in and of itself, but conforms to well known principles of electronic circuitry. Thus, a step-down transformer 23 receives power from a customary 115 v. source of 60 cycle alternating current and feeds it through control rheostat 22 and rectifier 24 to a transistorized oscillator circuit 25, which, in turn, feeds current of variable frequency from its output transformer 26 to input leads 27 of the electromagnetic field structure 16 of the torque converter 10.

A capacitance 28 is advantageously shunted across leads 27 to reduce the current required by field structure 16 to a value sufficient only to compensate for the resistance losses therein.

Windings 16a of field structure 16, see FIG. 1, are connected through sliprings 29 and 30 and brushes 31 and 32 to the leads 27, so that such windings are excited with electric power of selected voltages and frequency as determined by the setting of rheostat 22, which is manually controlled by means of knob 22a.

Rotor 13 is driven at a substantially constant speed by engine 11, so as to operate at maximum efficiency as, in effect, a generator, there being induced therein currents of a relatively high magnitude which are carried to a quadrature position. These set up in space a rotary field which interacts with the magnetic field of field structure 16. So long as windings 16a are excited with current of the same frequency as that induced in rotor 13, there is no relative rotation between their magnetic fields and field structure 16 is held stationary.

When the frequency of the field structure current is decreased below that of the frequency of the current induced in rotor 13, field structure 16 rotates in the same direction as rotor 13. When the frequency of the field exciting current is increased above that of the frequency of the current induced in rotor 13, field structure 16 rotates in a direction opposite to that of rotor 13. In either direction of rotation, the speed of field structure 16 is always a function of the difference of the frequencies.

It is not necessary for the field structure exciting current to have a frequency centered about the frequency of the current induced in the rotor. The field structure may be built with any number of poles and excited with any frequency compatible with the magnetic structure. Moreover, the driving mechanism may have a speed which is higher or lower than the design output speed of the field structure.

Since the exciting current is very small, the polar elements of field structure 16 and the exciting frequency may be arranged to give almost any desired range of output speeds.

It has been found that field structure 16 may be held at zero speed for long periods without overheating and will develop a full torque that prevents turning of the output shaft 12. Acceleration rates may be very low, increasing in increments of only 1 r.p.m., or even less. Moreover, maximum torque is a direct function of the exciting voltage applied to the field structure 16.

The performance curve of FIG. 3 shows how the full-load torque output may be maintained constant from maximum speed in a clockwise direction of rotation through zero speed to maximum speed in a counterclockwise direction of rotation.

For large power outputs, the prime mover may be employed to drive a rotating amplifier, the frequency and voltage of which are controlled by the oscillator. Thus, as shown in FIG. 4, a prime mover in the form of an electric motor 35 adapted to rotate at constant speed is coupled in driving relationship to a rotating amplifier 36, which has a two phase motor structure.

One phase of amplifier 36, is a winding 37 electrically connected to the output transformer 26 of oscillator 21. The other phase is a winding 38 connected to the input leads 27 of field structure 16. This arrangement permits very large power outputs to be controlled by an oscillator of smaller size than would otherwise be true.

A further advantage of this arrangement is that the rotary amplifier may be provided by changing the connections of an ordinary capacitor type, single phase motor, without the necessity of building a special machine.

For exact positioning of the driven load independently of the degree of loading when the device is used as a servo mechanism, driver or prime mover 35 should be a synchronous motor, see FIG. 4. Torque conversion means 10 will, under these circumstances, be in the form of a non-excited synchronous motor, with means provided for applying feed-back to oscillator 21. As shown in the dotted portion of FIG. 2, such means may conveniently take the form of a variable impedance, such as a rheostat 39 or adjustable transformer, controlled by the position of the driven load, as, for example, by means of a rack mechanism 40, and electrically connected to the power input of oscillator 21 as indicated.

With this arrangement, the speed of field structure 16 is a function of the frequency of oscillator 21 only. This is of particular value in certain types of high-speed high-performance, servo mechanisms extensively employed in critical control jobs for aircraft, gas and steam turbines, etc., because the final position of the servo mechanism is precisely proportional to the input signal.

It will be realized that, since no special provision is made in oscillator circuit 25 to control the voltage independently of the frequency of the power output, such voltage will vary linearly with variations in frequency, as is required for use in this invention, and both voltage and frequency will vary with the D.C. input from rectifier 24.

Whereas there are here illustrated and described certain forms of apparatus which I presently regard as the best mode of carrying out my invention, it should be understood that various changes may be made without departing from the inventive concepts particularly pointed out and distinctly claimed herebelow.

I claim:

1. A magnetoelectric torque converter, comprising single phase induction motor structure, including a non-excited rotor having a drive shaft adapted for mechanical drive connection with a prime mover, and rotatable field structure having electrically energizable windings and torque output means adapted for mechanical drive connection with a device to be driven; a non-reversible source of variable frequency electric current electrically connected to said windings for exciting the same; and means for varying the frequency of the electric current supplied to said windings by said source, whereby reversible output torque controllable in speed but constant in value is obtainable from said torque output means over a range extending from maximum output speed in one direction, through zero speed, to maximum output speed in the reverse direction, and vice versa.

2. The magnetoelectric torque converter of claim 1, additionally comprising a capacitor shunted across the output of said variable frequency source to reduce the current required by said field structure to a value sufficient only to compensate for resistance losses in said field structure.

3. The magnetoelectric torque converter of claim 1, wherein means are provided for electrical feedback from the driven load to the source of variable frequency electric current, to permit speed control of the driven load independently of the degree of loading.

4. A magnetoelectric torque converter, comprising non-excited synchronous motor structure including a rotor having a drive shaft adapted for mechanical drive connection with a prime mover, and rotatable field structure having electrically energizable windings and torque output means adapted for mechanical drive connection with a device to be driven; a non-reversible source of variable frequency electric current electrically connected to said windings for exciting the same; and means for varying the frequency of the electric current supplied to said windings by said source, whereby reversible output torque controllable in speed but constant in value is obtainable from said torque output means over a range extending from maximum output speed in one direction, through zero speed, to maximum output speed in the reverse direction, and vice versa.

5. The magnetoelectric torque converter of claim 4, additionally comprising a capacitor shunted across the output of said variable frequency source to reduce the current requried by said field structure to a value sufficient only to compensate for resistance losses in said field structure.

6. The magnetoelectric torque converter of claim 4, wherein positional feed-back means are provided to permit speed control of the driven load independently of the degree of loading.

7. A magnetoelectric torque converter, comprising single phase induction motor structure, including a non-excited rotor having a drive shaft adapted for mechanical drive connection with a prime mover, and rotatable field structure having electrically energizable windings and torque output means adapted for mechanical drive connection with a device to be driven; a rotating amplifier in the form of a two-phase electric motor driven by said prime mover; a non-reversible source of variable frequency electric current electrically connected to one phase of said rotating amplifier for exciting the same, the other phase of said rotating amplifier being connected to said field structure for exciting it with amplified current of the same frequency as the electric current supplied by said source and of voltage which is proportional to said frequency; and means for varying the frequency of said source, whereby reversible output torque controllable in speed but constant in value is obtainable from said torque output means over a range extending from maximum output speed in one direction, through zero speed, to maximum output speed in the reverse direction, and vice versa.

8. The magnetoelectric torque converter of claim 7, additionally comprising a capacitor shunted across the output of said variable frequency source to reduce the current required by said field structure to a value sufficient only to compensate for resistance losses in said field structure.

9. The magnetoelectric torque converter of claim 7, wherein positional feed-back means are provided to permit speed control of the driven load independently of the degree of loading.

10. A magnetoelectric torque converter, comprising non-excited synchronous motor structure, including a rotor having a drive shaft adapted for mechanical drive connection with a prime mover, and rotatable field structure having electrically energizable windings and torque output means adapted for mechanical drive connection with a device to be driven; a rotating amplifier in the form of a two-phase electric motor driven by said prime mover; a non-reversible source of variable frequency electric current electrically connected to one phase of said rotating amplifier for exciting the same, the other phase of said rotating amplifier being connected to said field structure for exciting it with amplified current of the same frequency as the electric current supplied by said source and of voltage which is proportional to said frequency; and means for varying the frequency of said source, whereby reversible output torque controllable in speed but constant in value is obtainable from said torque output means over a range extending from maximum output speed in one direction, through zero speed, to maximum output speed in the reverse direction, and vice versa.

11. The magnetoelectric torque converter of claim 10, additionally comprising a capacitor shunted across the output of said variable frequency source to reduce the current required by said field structure to a value sufficient only to compensate for resistance losses in said field structure.

12. The magnetoelectric torque converter of claim 10, wherein positional feed-back means are provided to permit speed control of the driven load independently of the degree of loading.

References Cited by the Examiner

UNITED STATES PATENTS

| | | | |
|---|---|---|---|
| 591,267 | 10/97 | Bradley | 318—415 X |
| 1,598,268 | 8/26 | De Coninck | 318—415 X |
| 1,983,896 | 12/34 | Bottcher | 318—205 |

FOREIGN PATENTS

| | | |
|---|---|---|
| 282,671 | 3/15 | Germany. |
| 365,802 | 12/38 | Italy. |

MILTON O. HIRSHFIELD, *Primary Examiner.*

ORIS L. RADER, DAVID X. SLINEY, *Examiners.*